United States Patent
Harada et al.

(10) Patent No.: US 8,422,201 B2
(45) Date of Patent: Apr. 16, 2013

(54) SOLID ELECTROLYTIC CAPACITOR AND FABRICATION METHOD THEREOF

(75) Inventors: Gaku Harada, Kawanishi (JP); Takeshi Sano, Takatsuki (JP); Miwa Ogawa, Hirakata (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 617 days.

(21) Appl. No.: 12/565,623

(22) Filed: Sep. 23, 2009

(65) Prior Publication Data
US 2010/0079928 A1 Apr. 1, 2010

(30) Foreign Application Priority Data

Sep. 29, 2008 (JP) ................................. 2008-250188
Aug. 28, 2009 (JP) ................................. 2009-197617

(51) Int. Cl.
*H01G 9/02* (2006.01)
(52) U.S. Cl.
USPC ........................................ 361/525; 29/25.03
(58) Field of Classification Search .......... 361/523–524, 361/525; 29/25.03
See application file for complete search history.

(56) References Cited

U.S. PATENT DOCUMENTS

| 5,124,022 | A | 6/1992 | Evans, II et al. |
| 6,430,033 | B1 * | 8/2002 | Mitsui et al. ................... 361/525 |
| 2006/0084237 | A1 * | 4/2006 | Kobayashi .................... 438/381 |
| 2007/0230092 | A1 * | 10/2007 | Bruner et al. ................. 361/523 |
| 2008/0316680 | A1 | 12/2008 | Iida et al. |

FOREIGN PATENT DOCUMENTS

| CN | 101136285 A | 3/2008 |
| JP | 01-287915 | 11/1989 |
| JP | 02-074021 | 3/1990 |
| JP | 04-073924 | 3/1992 |
| JP | 08-293436 | 11/1996 |
| JP | 11-329900 | 11/1999 |
| JP | 2006-140443 | 6/2006 |

* cited by examiner

*Primary Examiner* — Eric Thomas
(74) *Attorney, Agent, or Firm* — Marvin A. Motsenbocker; Mots Law, PLLC (57) ABSTRACT

A solid electrolytic capacitor comprising an anode composed of a valve metal or its alloy, a dielectric layer formed on a surface of the anode, a coupling agent layer formed by subjecting the dielectric layer to a surface treatment with a coupling agent having a phosphonic acid group, a conductive polymer layer formed on the coupling agent layer, and a cathode layer formed on the conductive polymer layer.

11 Claims, 4 Drawing Sheets

SOLID ELECTROLYTIC CAPACITOR AND FABRICATION METHOD THEREOF

BACKGROUND OF THE INVENTION

1. Technical Field

The present invention relates to a solid electrolytic capacitor using a conductive polymer as a solid electrolyte and a fabrication method thereof.

2. Description of Related Art

With recent reduction in size and weight of electronic devices, there is an increasing demand for a high-frequency capacitor which is small in size and high in capacity. For such a capacitor, a solid electrolytic capacitor has been proposed which has a dielectric layer formed by oxidizing a surface of an anode comprised of a sintered body of a valve metal, such as tantalum, niobium, titanium or aluminum, and a solid electrolyte layer disposed on the dielectric layer. In the effort to reduce an equivalent series resistance (ESR), a conductive polymer is used for the solid electrolyte layer.

However, deterioration of adhesion between the inorganic dielectric layer and the organic conductive polymer layer, if occurs, problematically increases leakage current and ESR.

Japanese Patent Laid-open Nos. Hei 2-74021, Hei 4-73924 and Hei 8-293436 propose to subject a dielectric layer formed on a surface of an anode to a surface treatment with a silane coupling agent before a conductive polymer layer is deposited.

Japanese Patent Laid-open No. Hei 11-329900 proposes to repeat a sequence of treating with a silane coupling agent and forming a conductive polymer layer onto the dielectric layer.

Japanese Patent Laid-open No. 2006-140443 proposes forming a first conductive polymer layer on a surface portion of a dielectric layer, treating the remaining surface portion of the dielectric layer with a silane coupling agent to form a treated layer and then forming a second conductive polymer layer over the first conductive polymer layer and the treated layer.

However, the amount of the silane coupling agent that reacts with or adsorbs onto a substrate varies depending on the surface condition of the substrate, specifically, depending on its hydroxyl content. Also because the silane coupling agent starts a reaction with a hydrolysis reaction by water, it is readily influenced such as by ambient moisture, which has been a problem.

Accordingly, there has been a need for a solid electrolytic capacitor which can be fabricated without using a silane coupling agent in the preceding fashions, has a high capacitance and exhibits low ESR and leakage current.

SUMMARY OF THE INVENTION

It is an object of the present invention to provide a solid electrolytic capacitor which is high in capacitance and low in ESR and leakage current and a fabrication method of the solid electrolytic capacitor.

The solid electrolytic capacitor according to a first aspect of the present invention is characterized as including an anode composed of a valve metal or its alloy, a dielectric layer formed on a surface of the anode, a coupling agent layer formed on the dielectric layer and containing a coupling agent having a phosphonic acid group, a conductive polymer layer formed on the coupling agent layer, and a cathode layer formed on the conductive polymer layer.

The solid electrolytic capacitor according to a second aspect of the present invention is characterized as including an anode composed of a valve metal or its alloy, a dielectric layer formed on a surface of the anode, a first coupling agent layer formed on the dielectric layer and containing a coupling agent having a phosphonic acid group, a first conductive polymer layer formed on the first coupling agent layer, a second coupling agent layer formed on the first conductive polymer layer and containing a coupling agent having a phosphonic acid group, a second conductive polymer layer formed on the second coupling agent layer, and a cathode layer formed on the second conductive polymer layer.

The solid electrolytic capacitor according to a third aspect of the present invention is characterized as including an anode composed of a valve metal or its alloy, a dielectric layer formed on a surface of the anode, a first conductive polymer layer formed on a surface portion of the dielectric layer, a coupling agent layer formed over the first conductive polymer layer and the surface region of the dielectric layer that is left uncovered by the first conductive polymer layer and containing a coupling agent having a phosphonic acid group, a second conductive polymer layer formed on the coupling agent layer, and a cathode layer formed on the second conductive polymer layer.

In the third aspect of the present invention, the solid electrolytic capacitor may further include a third conductive polymer layer between the second conductive polymer layer and the cathode layer. In this case, a second coupling agent layer containing a coupling agent having a phosphonic acid group may further be provided between the second and third conductive polymer layers.

In the third aspect of the present invention, the first conductive polymer layer is formed on a surface portion of the dielectric layer, as described above. For example, the first conductive polymer layer may be formed as a pattern of islands distributed over the dielectric layer.

In the second aspect of the present invention, the coupling agent having a phosphonic acid group is used to form the first coupling agent layer on the dielectric layer. The first conductive polymer layer is formed on the first coupling agent layer. The coupling agent having a phosphonic acid group is again used to form the second coupling agent layer on the first conductive polymer layer. Finally, the second conductive polymer layer is formed on the second coupling agent layer.

In the third aspect of the present invention, the first conductive polymer layer is formed on a surface portion of the dielectric layer. The first conductive polymer layer and the surface region of the dielectric layer that is left uncovered by the first conductive polymer layer are subjected to a surface treatment using the coupling agent having a phosphonic acid group to form the coupling agent layer. Finally, the second conductive polymer layer is formed on the coupling agent layer.

The fabrication method of the present invention is a method which can fabricate the solid electrolytic capacitor according to the first aspect of the present invention and is characterized as including the steps of forming a dielectric layer on a surface of an anode composed of a valve metal or its alloy, forming a coupling agent layer containing a coupling agent having a phosphonic acid group on the dielectric layer, forming a conductive polymer layer on the coupling agent layer and forming a cathode layer on the conductive polymer layer.

The method for fabrication of a solid electrolytic capacitor according to the second aspect of the present invention is characterized as including the steps of forming a dielectric layer on a surface of an anode composed of a valve metal or its alloy, forming a first coupling agent layer containing a coupling agent having a phosphonic acid group on the dielectric layer, forming a first conductive polymer layer on the first coupling agent layer, forming a second coupling agent layer containing a coupling agent having a phosphonic acid group on the first conductive polymer layer, forming a second conductive polymer layer on the second coupling agent layer, and forming a cathode layer on the second conductive polymer layer.

The method for fabrication of a solid electrolytic capacitor according to the third aspect of the present invention is characterized as including the steps of forming a dielectric layer on a surface of an anode composed of a valve metal or its alloy, forming a first conductive polymer layer on a surface portion of the dielectric layer, forming a coupling agent layer containing a coupling agent having a phosphonic acid group over the first conductive polymer layer and the surface region of dielectric layer that is left uncovered by the first conductive polymer layer, forming a second conductive polymer layer on the coupling agent layer, and forming a cathode layer on the second conductive polymer layer.

In the third aspect where the third conductive polymer layer is formed on the second conductive polymer layer, the fabrication method includes the steps of forming a dielectric layer on a surface of an anode composed of a valve metal or its alloy, forming a first conductive polymer layer on a surface portion of the dielectric layer, forming a coupling agent layer containing a coupling agent having a phosphonic acid group over the first conductive polymer layer and the surface region of dielectric layer that is left uncovered by the first conductive polymer layer, forming a second conductive polymer layer on the coupling agent layer, forming a third conductive polymer layer on the second conductive polymer layer, and forming a cathode layer on the third conductive polymer layer.

In the third aspect where the second coupling agent layer is interposed between the second conductive polymer layer and the third conductive polymer layer, the fabrication method includes the steps of forming a dielectric layer on a surface of an anode composed of a valve metal or its alloy, forming a first conductive polymer layer on a surface portion of the dielectric layer, forming a first coupling agent layer containing a coupling agent having a phosphonic acid group over the first conductive polymer layer and the surface region of dielectric layer that is left uncovered by the first conductive polymer layer, forming a second conductive polymer layer on the first coupling agent layer, forming a second coupling agent layer containing a coupling agent having a phosphonic acid group on the second conductive polymer layer, forming a third conductive polymer layer on the second coupling agent layer, and forming a cathode layer on the third conductive polymer layer.

DESCRIPTION OF THE PREFERRED EXAMPLES

The following specific examples illustrate the present invention but are not intended to be limiting thereof.

EXAMPLES 1-2 AND COMPARATIVE EXAMPLES 1-3

Example 1

Figure 1:
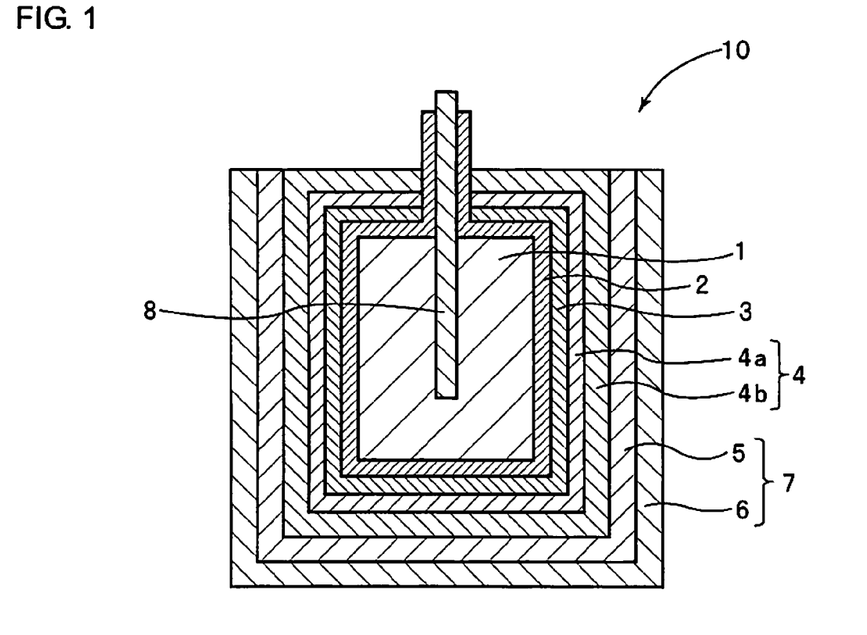
FIG. 1 is a schematic sectional view which shows a solid electrolytic capacitor of Example 1 according to a first aspect of the present invention.
Figure 7:
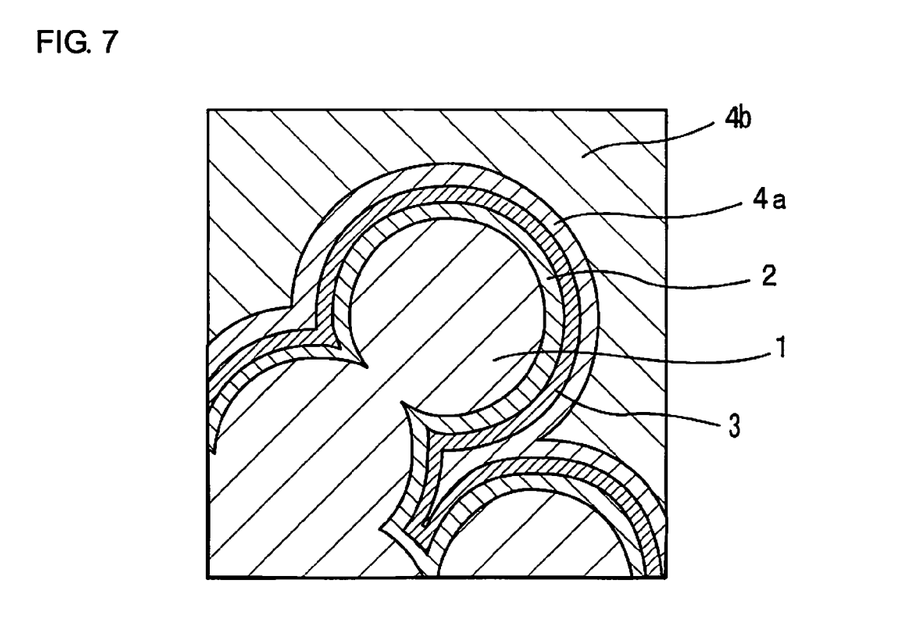
FIG. 7 is a sectional view which shows main portions of a solid electrolytic capacitor in Example 1 according to the first aspect of the present invention.

FIG. 1 is a schematic sectional view which shows a solid electrolytic capacitor of this Example. An anode lead 8 is partly embedded in an anode 1 having a generally square prismatic shape. A dielectric layer 2 is formed on a surface of the anode 1. The anode 1 comprises a porous body made by sintering a powder of a valve metal or its alloy. As shown in FIG. 7, the porous anode 1 is formed by sintering a lot of particles spaceded from one another, so that the dielectric layer 2 is formed on the surfaces of the particles consisting the the anode 1.

The dielectric layer 2 is subjected to a surface treatment with a coupling agent having a phosphonic group so that a coupling agent layer 3 is formed on the dielectric layer 2. The coupling agent layer 3 also covers the dielectric layer 2 interior of the anode 1.

A first conductive polymer layer 4a is formed on the coupling agent layer 3. The first conductive polymer layer 4a also covers the coupling agent layer 3 interior of the anode 1. In this Example, the first conductive polymer layer 4a is formed by chemical oxidative polymerization.

A second conductive polymer layer 4b is formed on the first conductive polymer layer 4a. The second conductive polymer layer 4b is formed so that the spaces between the particles consisting the anode 1 are filled with the second conductive polymer layer 4b. In this Example, the second conductive polymer layer 4b is formed by electrochemical electrolytic polymerization.

The first and second conductive polymer layers 4a and 4b together constitute a conductive polymer layer 4.

A carbon layer 5 is deposited on the second conductive layer 4b over a peripheral portion of the anode 1. The carbon layer 5 is deposited by applying and drying a carbon paste.

A silver layer 6 is deposited on the carbon layer 5. The silver layer 6 is deposited by applying and drying a silver paste. The carbon layer 5 and the silver layer 6 together constitute a cathode layer 7.

The above procedure results in the fabrication of a capacitor element 10. An anode terminal and a cathode terminal are connected to the capacitor element 10. A resin outer casing is formed in a mold such that respective leading ends of the anode and cathode terminals are exposed to an outside, resulting in the fabrication of a solid electrolyte capacitor. The cathode terminal is connected to the silver layer 6 through a conductive adhesive layer. The anode terminal is connected to an anode lead 8 such as by welding.

More specifically, the solid electrolytic capacitor of this Example is fabricated in the following manner.

The anode 1 has a shape of a rectangular parallelopiped measuring 2.3 mm×1.8 mm×1.0 mm. The anode lead 8 is embedded in the anode to extend along a lateral side (2.3 mm×1.0 mm) of the anode. The anode 1 and the anode lead 8 are both composed of tantalum (Ta). The anode 1 comprises a porous body made by sintering a powder of tantalum.

The anode 1 was electrolytically oxidized in an aqueous solution of phosphoric acid at 65° C. by application of a constant voltage of 10 V for 10 hours, so that the dielectric layer 2 was deposited on a surface of the anode 1.

Next, the anode 1 with the dielectric layer 2 deposited thereon was immersed for 1 hour in a 25° C. isopropyl alcohol solution containing the coupling agent having a phosphonic acid group, in the form of octadecylphosphonic acid at the concentration of 0.5 mM (millimole/liter), removed from the solution, washed with isopropyl alcohol and dried at 60° C. for 10 minutes. As a result, the coupling agent layer 3 was deposited on the dielectric layer. A film thickness of the coupling agent layer 3 was about 2 nm.

Next, the anode was immersed in an ethanol solution containing 3.0 M (mole/liter) of pyrrole for 5 minutes and then immersed in an aqueous solution containing 0.1 M of ammonium persulfate and 0.1 M of alkylnaphthalenesulfonic acid at 25° C. for 5 minutes, so that the first conductive polymer layer 4a was deposited on the dielectric layer 2. Subsequently, the anode with the first conductive polymer layer 4a deposited thereon was immersed in an aqueous solution containing 0.2 M of pyrrole and 0.2 M of alkylnaphthalenesulfonic acid at 25° C. and charged with a current of 0.5 mA for 3 hours as the first conductive polymer layer 4a served as an anode. As a result, the second conductive polymer layer 4b was deposited.

Next, a carbon paste was applied onto the second conductive polymer layer 4b over a peripheral portion of the anode 1 and then dried to form the carbon layer 5. A silver paste was applied onto the carbon layer 5 and then dried to form the silver layer 6.

Further, an anode terminal is welded to the anode lead 8 and a cathode terminal is connected to the silver layer 6 through a conductive adhesive layer. An epoxy resin was transfer molded to cover the capacitor element 10 in such away that respective leading ends of the anode and cathode terminals are exposed to an outside, resulting in the fabrication of a solid electrolyte capacitor A1.

In the present invention, the coupling agent layer is formed using a coupling agent having a phosphonic acid group. Since the coupling agent having a phosphonic acid group reacts directly with an oxide film of the dielectric layer, the amount of a coupling agent that reacts to the dielectric layer can be increased by using this coupling agent relative to using a silane coupling agent. The increased amount of the reacting coupling agent increases a percent coverage of the dielectric layer by the coupling agent layer, resulting in increasing a capacitance and lowering ESR and leakage current. That is, an increase of amount of adsorption or percent coverage improves adhesion between the dielectric layer and the conductive polymer layer, so that a contact resistance between them and accordingly ESR can be lowered. Also because the coupling agent layer thoroughly covers the dielectric layer, it serves as an insulation film between the dielectric layer and the conductive electrolyte layer to achieve reduction of a leakage current caused by a defect in the dielectric layer. Due also to their organic nature, the coupling agent layer and the conductive polymer layer have an affinity towards each other. This improves a percent coverage of the conductive electrolyte layer and, as a result, achieves capacitance increase.

The silane coupling agent is hydrolyzed by water to silanol (Si—OR→Si—OH) and partially condensed into an oligomer form. It subsequently adsorbs onto a hydroxyl group on an inorganic surface and, when an inorganic material is subjected to a heat treatment, undergoes a dehydrocondensation reaction to form a strong chemical linkage. Since water initiates the hydrolysis reaction, an operation must be carried out in an atmosphere that prevents entrance of water content in an ambient air or solvent. Alternatively, a solution of a silane coupling agent must be used immediately after preparation thereof. Unlike the silane coupling agent, the coupling agent having a phosphonic acid group does not require a hydrolysis reaction because it is of a structure originally having a hydroxyl group (P—OH). It is accordingly unaffected by a water content in an ambient air or solvent. Hence, the coupling agent having a phosphonic acid group exhibits superior storage stability and enables fabrication of a solid electrolytic capacitor having a stable quality level by the present invention.

The coupling agent in the present invention can also serve as a dopant for the conductive polymer compound by incorporating its phosphonic acid group into the conductive polymer compound. Accordingly, the coupling agent can improve conductivity of the conductive polymer layer. This also lowers ESR.

In the first aspect of the present invention, the coupling agent having a phosphonic acid group is used to form the coupling agent layer on the dielectric layer. The conductive polymer layer is formed on the coupling agent layer. This construction increases a percent coverage of the dielectric layer by the coupling agent layer as well as improves adhesion between the dielectric layer and the conductive polymer layer. As a result, a solid electrolytic capacitor can be provided which is high in capacitance and low in ESR and leakage current.

In the second aspect of the present invention, the first coupling agent layer, first conductive polymer layer, second coupling agent layer and second conductive polymer layer are formed successively. This arrangement increases a percent coverage by each coupling agent layer as well as further improves adhesion of the conductive polymer layers to the dielectric layer. As a result, a solid electrolytic capacitor can be provided which is high in capacitance and low in ESR and leakage current.

In the third aspect of the present invention, the first conductive polymer layer is formed on a surface portion of the dielectric layer, followed by formation of the coupling agent layer. The coupling agent layer is deposited not only on the first conductive polymer layer but also over the surface region of the dielectric layer that remains uncovered by the first conductive polymer layer. Accordingly, a percent coverage of the second conductive polymer layer can be increased. The coupling agent layer is also deposited on defect portions of the dielectric layer, if any, to restore them. As a result, a solid electrolytic capacitor can be provided which is high in capacitance and low in ESR and leakage current.

In the third aspect of the present invention, the coupling agent layer is formed on the first conductive polymer layer. Since the coupling agent in the present invention can serve as a dopant for conductive polymer, as described above, the coupling agent layer is partly incorporated in the first conductive polymer layer to improve electrical conductivity of the first conductive polymer layer and thereby achieve further ESR reduction.

Also in the third aspect of the present invention, a third conductive polymer layer may be interposed between the second conductive polymer layer and the cathode layer. Also in this case, a second coupling agent layer maybe provided between the second and third conductive polymer layers. The second coupling agent layer is also partly incorporated in the second conductive polymer layer, as a dopant, to improve electrical conductivity of the second conductive polymer layer and thereby achieve further ESR reduction.

The coupling agent for use in the present invention may be represented by the following general formula:

wherein R represents a hydrocarbon group having a carbon number of 1-18, alkyl group having a carbon number of 1-18, alkoxy group, aryl group, phenyl group, ether group, thiophen group, pyrrole derivative, aniline derivative, vinyl-containing derivative, epoxy-containing derivative, styryl-containing derivative, methacryloxy-containing derivative, acryloxy-containing derivative, amino-containing derivative, ureido-containing derivative, chloropropyl-containing derivative, mercapto-containing derivative, sulfide-containing derivative or isocyanate-containing derivative.

Examples of epoxy-containing derivatives include epoxy-cyclohexyl and glycidoxypropyl groups. Examples of amino-containing derivatives include N-aminoethyl aminopropyl, aminopropyl, dimethylbutylidene propylamine, N-phenyl aminopropyl and N-vinylbenzyl aminoethyl aminopropyl groups. The ureido-containing derivative can be illustrated by an ureidopropyl group. The mercapto-containing derivative can be illustrated by a methylmercaptopropyl group. The sulfide-containing derivative can be illustrated by a tetrasulfide group. The isocyanate-containing derivative can be illustrated by an isocyanatepropyl group.

The conductive polymer layer in the present invention can be formed by subjecting a suitable monomer to chemical oxidative polymerization or electrochemical electrolytic polymerization. Examples of monomers for conversion to the conductive polymer include pyrrole, thiophene, aniline and their derivatives. Alternatively, it can be formed using a dispersion containing fine particles of a previously prepared conductive polymer or a soluble conductive polymer capable of being dissolved in a solvent.

In accordance with the fabrication method of the present invention, a solid electrolytic capacitor can be fabricated which is high in capacitance and low in ESR and leakage current.

In accordance with the above method which can fabricate the solid electrolytic capacitor according to the second aspect, a solid electrolytic capacitor can be fabricated which is high in capacitance and low in ESR and leakage current.

In accordance with the above method which can fabricate the solid electrolytic capacitor according to the third aspect, a solid electrolytic capacitor can be fabricated which is high in capacitance and low in ESR and leakage current.

Example 2

Figure 2:
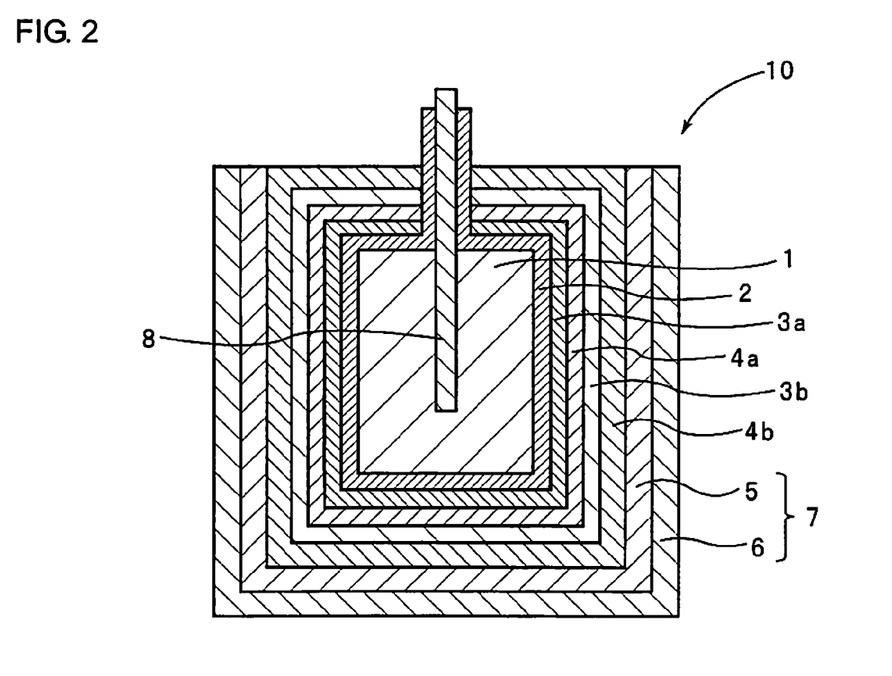
FIG. 2 is a schematic sectional view which shows a solid electrolytic capacitor of Example 2 according to a second aspect of the present invention.

FIG. 2 is a schematic sectional view which shows a solid electrolytic capacitor of this Example. As shown in FIG. 2, in the solid electrolytic capacitor of this Example, the dielectric layer 2 is formed on the anode 1 and then the first coupling agent layer 3a is formed in the same manner as in Example 1. Subsequent to formation of the first coupling agent layer 3a, the first conductive polymer layer 4a is formed.

Subsequent to formation of the first conductive polymer layer 4a, the anode was immersed in a 25° C. isopropyl alcohol solution containing 0.5 mM of octadodecylphosphonic acid for 1 hour, washed with isopropyl alcohol and then dried at 60° C. for 10 minutes, as similar to Example 1. As a result, the second coupling agent layer 3b was deposited on the dielectric layer.

Subsequent to deposition of the second coupling agent layer 3b, the second conductive polymer layer 4b was formed in the same manner as in Example 1.

Subsequent to formation of the second conductive polymer layer 4b, the cathode layer 7 was deposited, anode and cathode terminals were connected and a resin outer casing was formed, as similar to Example 1. As a result, a solid electrolytic capacitor A2 was fabricated.

Comparative Example 1

Figure 6:
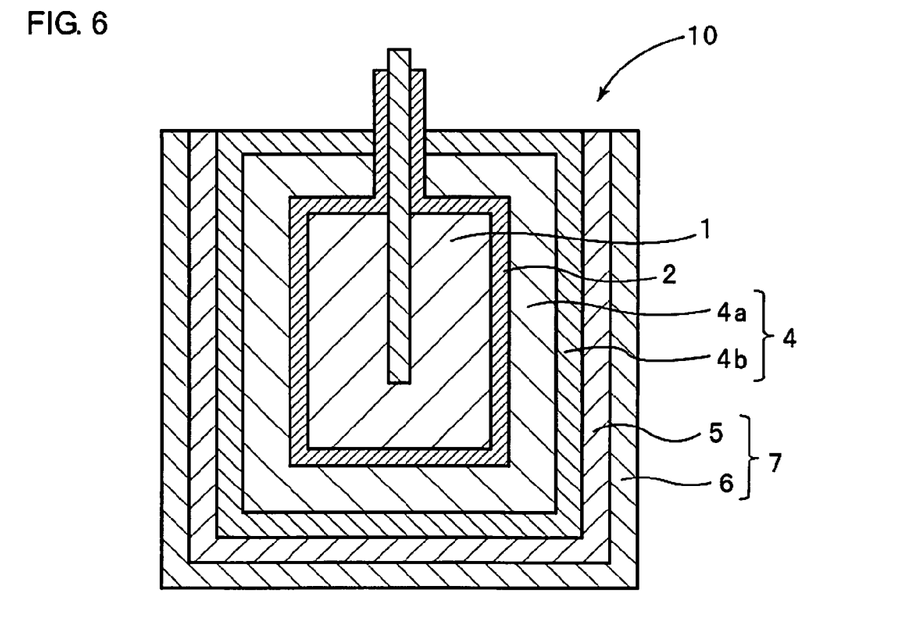
FIG. 6 is a schematic sectional view which shows a solid electrolytic capacitor of Comparative Example 1.

FIG. 6 is a schematic sectional view which shows a solid electrolytic capacitor of Comparative Example 1.

As shown in FIG. 6, in Comparative Example 1, subsequent to formation of the dielectric layer 2 on the anode 1, the first and second conductive polymer layers 4a and 4b are successively formed. Hence, the coupling agent layer is excluded.

Otherwise, the procedure of Example 1 was followed to fabricate a solid electrolytic capacitor C1.

Comparative Example 2

In Example 1, instead of using the coupling agent having a phosphonic acid group, a silane coupling agent in the form of 3-mercaptopropyltrimethoxysilane (product name "KBM-803", silane coupling agent manufactured by Shin-Etsu Chemical Co., Ltd.) was used. The anode was immersed in an aqueous solution containing 0.1 M of 3-mercaptopropyltrimethoxysilane at 25° C. for 10 minutes, dried at 130° C. for 30 minutes, washed with pure water and again dried at 100° C., so that the coupling agent layer was formed. Otherwise, the procedure of Example 1 was followed to fabricate a solid electrolytic capacitor C2.

Comparative Example 3

In Example 2, instead of using the coupling agent having a phosphonic acid group, the same silane coupling agent as in Comparative Example 2 was used to form the coupling agent layers 3a and 3b. Otherwise, the procedure of Example 2 was followed to fabricate a solid electrolytic capacitor C3.

(Properties Evaluation of Solid Electrolytic Capacitors)

The above-obtained solid electrolytic capacitors A1-A2, C1-C3 were each measured for capacitance, ESR and leakage current.

Capacitance was measured using an LCR meter (inductance-capacitance-resistance measuring device) at a frequency of 120 Hz. ESR was measured using an LCR meter at a frequency of 100 kHz. Leakage current was determined by applying a rated voltage and measuring a value after 30 seconds.

The measurement results are shown in Table 1 and are given by relative values when those for Comparative Example are taken as standards.

TABLE 1

|  | Solid Electrolytic Capacitor A1 | Solid Electrolytic Capacitor A2 | Solid Electrolytic Capacitor C1 | Solid Electrolytic Capacitor C2 | Solid Electrolytic Capacitor C3 |
| --- | --- | --- | --- | --- | --- |
| Capacitance | 1.04 | 1.07 | 1.00 | 1.04 | 1.05 |
| ESR | 0.97 | 0.90 | 1.00 | 1.00 | 0.92 |
| Leakage Current | 0.22 | 0.13 | 1.00 | 0.39 | 0.29 |

The solid electrolytic capacitor A1 of Example 1 according to the first aspect of the present invention, as well as the solid electrolytic capacitor A2 of Example 2 according to the second aspect of the present invention, exhibit higher capacitance values and lower ESR and leakage current values compared to the solid electrolytic capacitor C1 of Comparative Example 1. The formation of the coupling agent layer in accordance with the present invention is believed to improve a percent coverage of the conductive polymer layer and increase a capacitance.

Also, the improved adhesion of the conductive polymer layer to the dielectric layer is believed to lower a contact resistance between them and accordingly lower ESR values. Also, the provision of the coupling agent layer between the dielectric layer and the conductive polymer layer is believed to lower a leakage current caused by some defect in the dielectric layer by the function of the coupling agent layer as an insulation film.

By comparison between the solid electrolytic capacitor A1 of Example 1 using the coupling agent having a phosphonic acid group and the solid electrolytic capacitor C2 of Comparative Example 2 using a silane coupling agent, it is apparent that the use of the coupling agent having a phosphonic acid group lowers ESR and leakage current. This is probably because the coupling agent having a phosphonic acid group achieves a higher surface coverage or percent coverage of the dielectric layer compared to the silane coupling agent.

It is also apparent from comparison between the solid electrolytic capacitor A2 of Example 2 and the solid electrolytic capacitor C3 of Comparative Example 3 that the solid electrolytic capacitor A2 of Example 2 shows the reduced ESR and leakage current. This is probably because the coupling agent having a phosphonic acid group achieves a higher amount of adsorption onto the dielectric layer or a higher percent coverage of the dielectric layer compared to the silane coupling agent.

Examples 3-5 and Comparative Examples 4-6

Example 3

Figure 3:
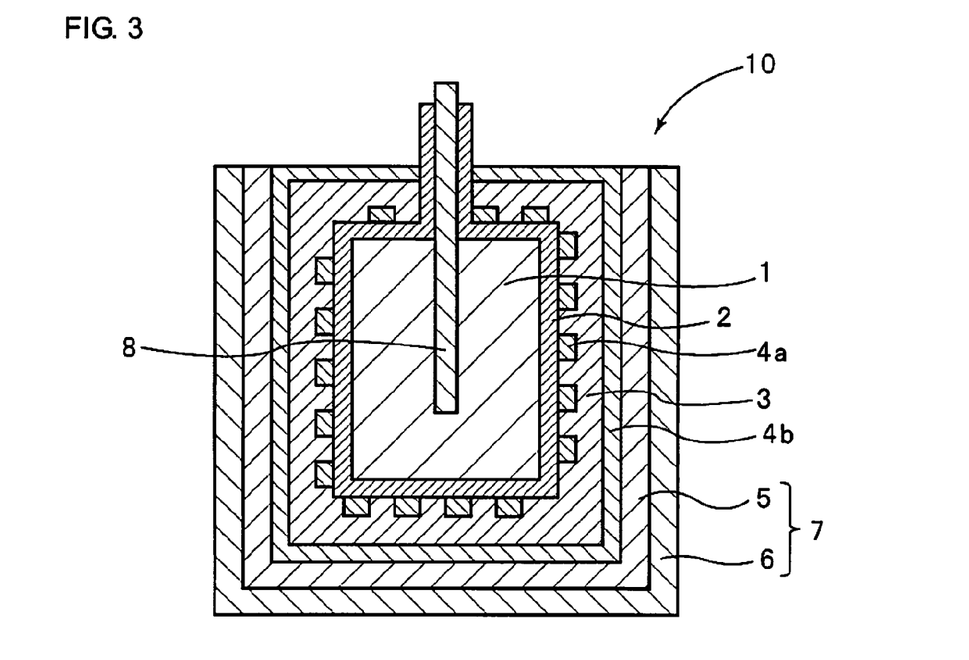
FIG. 3 is a schematic sectional view which shows a solid electrolytic capacitor of Example 3 according to a third aspect of the present invention.

FIG. 3 is a schematic sectional view which shows a solid electrolytic capacitor of this Example.

In this Example, the first conductive polymer layer 4a is formed on discrete surface portions of the dielectric layer 2. Subsequent to formation of the first conductive polymer layer 4a, the coupling agent layer 3 and the second conductive polymer layer 4b are successively formed.

Subsequent to formation of the dielectric layer 2 on the anode 1, the first conductive polymer layer 4a was formed in the same manner as in Example 1. However, the anode was immersed in the ethanol solution containing pyrrole for 1 minute and then in the aqueous solution containing ammonium persulfate and alkylnaphthalenesulfonic acid for 1 minute, so that the first conductive polymer layer 4a was formed as a pattern of islands distributed over the dielectric layer 2. After formation of the first conductive polymer layer 4a, the coupling agent layer 3 was formed in the same manner as in Example 1. This coupling agent layer 3 was deposited over the first conductive polymer layer 4a as well as the surface regions of the dielectric layer that remained uncovered by the first conductive polymer layer 4a.

Subsequently, the second conductive polymer layer 4b was formed in the same manner as in Example 1.

Subsequently, the cathode layer 7 was formed, anode and cathode terminals were connected and a resin outer casing was formed, as similar to Example 1. As a result, a solid electrolytic capacitor A3 was fabricated.

Figure 8:
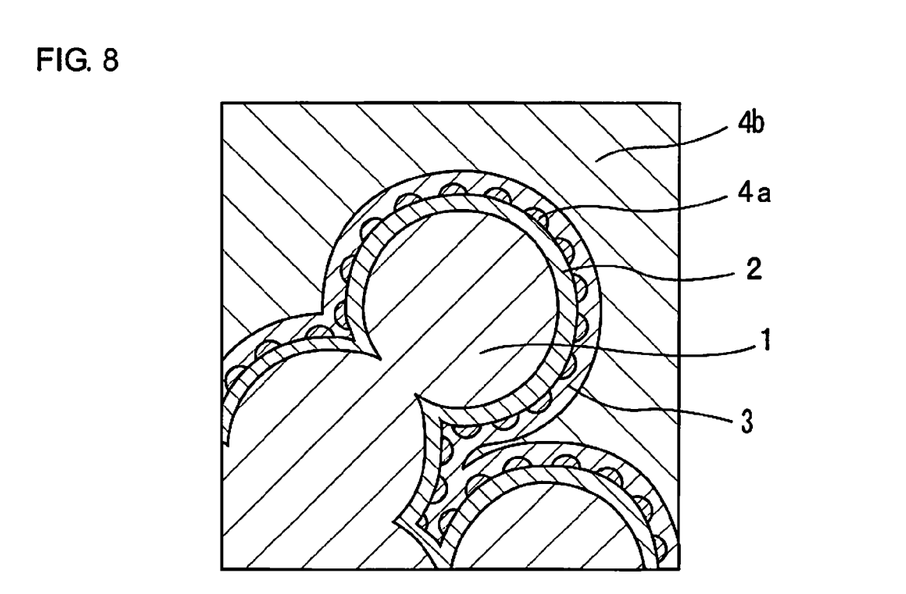
FIG. 8 is a sectional view which shows main portions of a solid electrolytic capacitor in Example 3 according to the third aspect of the present invention.

FIG. 8 is a schematic sectional view which shows the first conductive polymer layer 4a formed on the dielectric layer 2 formed on the surface of the particles consisting the porous anode 1. As shown in FIG. 8, the first conductive polymer layer 4a is formed as a pattern of islands distributed over the dielectric layer 2. The coupling agent layer 3 is formed on the first conductive polymer layer 4a and on the dielectric layer 2 within the region in which the first conductive polymer layer 4a is not formed. The second conductive polymer layer 4b is formed on the coupling agent layer 3.

Example 4

Figure 4:
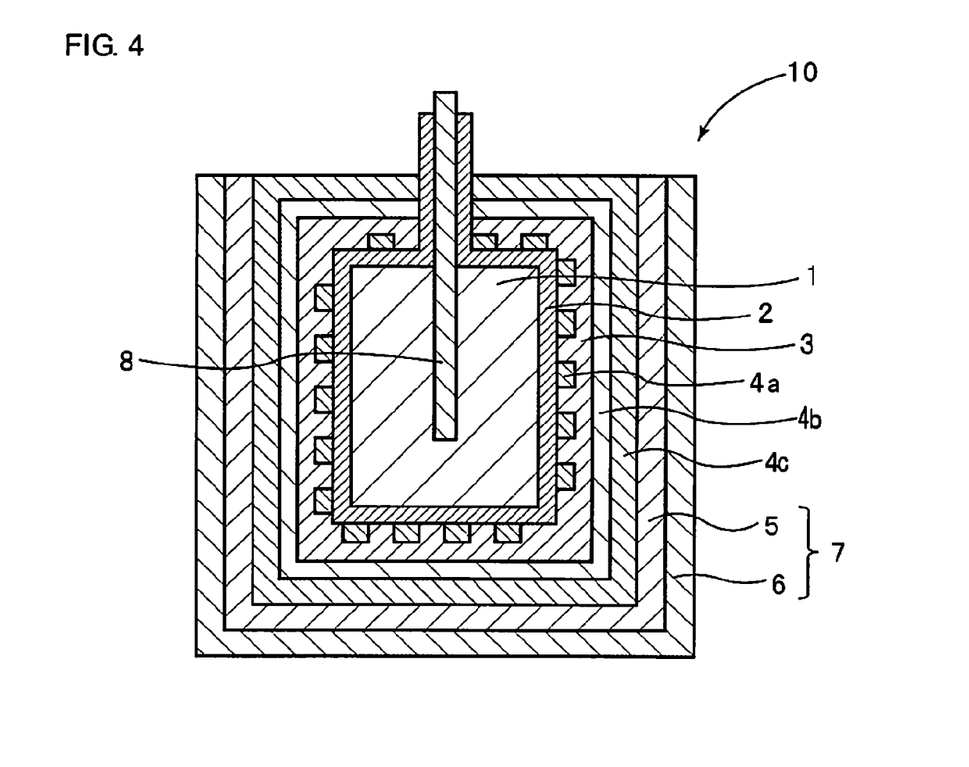
FIG. 4 is a schematic sectional view which shows a solid electrolytic capacitor of Example 4 according to the third aspect of the present invention.

FIG. 4 is a schematic sectional view which shows a solid electrolytic capacitor of this Example.

In this Example, the first conductive polymer layer 4a is formed on discrete surface portions of the dielectric layer 2, as shown in FIG. 4. Subsequent to formation of the first conductive polymer layer 4a, the coupling agent layer 3, the second conductive polymer layer 4b and the third conductive polymer layer 4c are successively formed.

Subsequent to formation of the dielectric layer 2 on the anode 1, the first conductive polymer layer 4a was formed in the same manner as in Example 1. However, the anode was immersed in the ethanol solution containing pyrrole for 1 minute and then in the aqueous solution containing ammonium persulfate and alkylnaphthalenesulfonic acid for 1 minute, so that the first conductive polymer layer 4a was formed as a pattern of islands distributed over the dielectric layer 2.

Subsequently, the coupling agent layer 3 was deposited over the first conductive polymer layer 4a as well as the surface regions of the dielectric layer that remained uncovered by the first conductive polymer layer 4a, as similar to Example 3.

Subsequently, the second conductive polymer layer 4b was deposited on the coupling agent layer 3 in the manner similar to the first conductive polymer layer 4a. Hence, the first and second conductive polymer layers 4a and 4b were both deposited by a chemical polymerization process.

Subsequently, the third conductive polymer layer 4c was deposited on the second conductive polymer layer 4b in the manner similar to the second conductive polymer layer in Example 1. Hence, the third conductive polymer layer 4c was deposited by an electrolytic polymerization process.

Subsequently, the cathode layer 7 was formed on the third conductive polymer layer 4c, anode and cathode terminals were connected and a resin outer casing was formed, as similar to Example 1. As a result, a solid electrolytic capacitor A4 was fabricated.

Example 5

Figure 5:
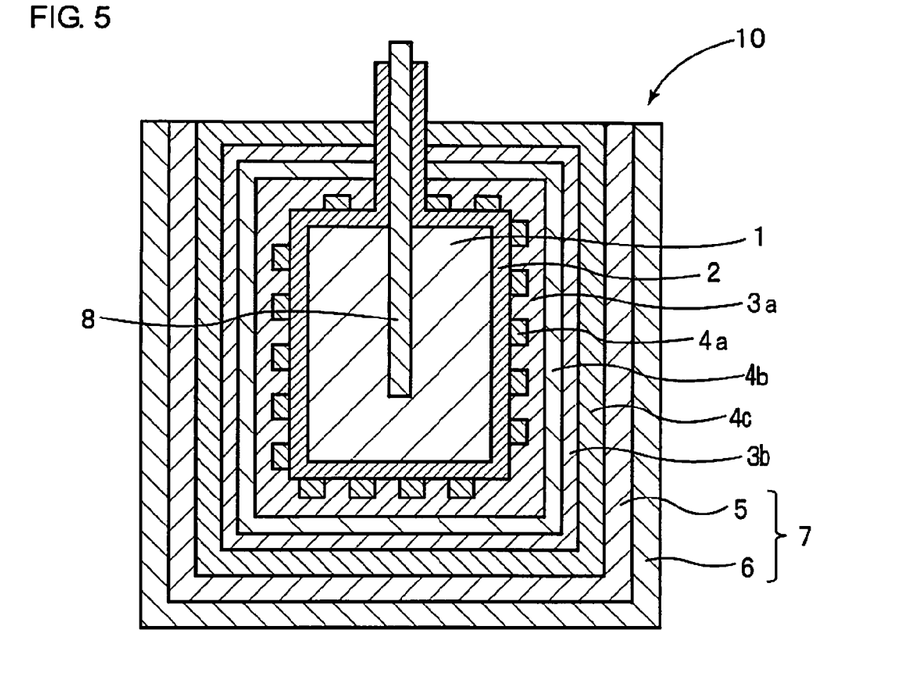
FIG. 5 is a schematic sectional view which shows a solid electrolytic capacitor of Example 5 according to the third aspect of the present invention.

FIG. 5 is a schematic sectional view which shows a solid electrolytic capacitor of this Example.

In this Example, the first conductive polymer layer 4a is formed on discrete surface portions of the dielectric layer 2, as shown in FIG. 5. Subsequent to formation of the first conductive polymer layer 4a, the first coupling agent layer 3a, the second conductive polymer layer 4b, the second coupling agent layer 3b and the third conductive polymer layer 4c are successively formed.

Subsequent to formation of the dielectric layer 2 on the anode 1, the first conductive polymer layer 4a was formed as a pattern of islands in the same manner as in Example 4. The first coupling agent layer 3a was subsequently formed on the first conductive polymer layer 4a in the same manner as in Example 4. The coupling agent layer 3a was deposited to overlie the first conductive polymer layer 4a as well as the surface regions of the dielectric layer that remained uncovered by the first conductive polymer layer 4a, as similar to Example 4.

Subsequently, the second conductive polymer layer 4b was deposited on the first coupling agent layer 3a in the same manner as in Example 4.

Subsequently, the second coupling agent layer 3b was deposited on the second conductive polymer layer 4b in the manner similar to the first coupling agent layer 3a.

Subsequently, the third conductive polymer layer 4c was deposited on the second coupling agent layer 3b in the same manner as in Example 4.

Subsequently, the cathode layer 7 was formed, anode and cathode terminals were connected and a resin outer casing was formed, as similar to Example 1. As a result, a solid electrolytic capacitor A5 was fabricated.

Comparative Example 4

In Example 3, instead of using the coupling agent having a phosphonic acid group, the same silane coupling agent as in Comparative Example 2 was used to form the coupling agent layer 3. Otherwise, the procedure of Example 3 was followed to fabricate a solid electrolytic capacitor C4.

Comparative Example 5

In Example 4, instead of using the coupling agent having a phosphonic acid group, the same silane coupling agent as in Comparative Example 2 was used to form the coupling agent layer 3. Otherwise, the procedure of Example 4 was followed to fabricate a solid electrolytic capacitor C5.

Comparative Example 6

In Example 5, instead of using the coupling agent having a phosphonic acid group, the same silane coupling agent as in Comparative Example 2 was used to form the coupling agent layer 3. Otherwise, the procedure of Example 5 was followed to fabricate a solid electrolytic capacitor C6.

(Properties Evaluation of Solid Electrolytic Capacitors)

The above-obtained solid electrolytic capacitors A3-A5 and C4-C6 were measured for capacitance, ESR and leakage current in the same manner as described above.

The measurement results are shown in Table 2 and are given by relative values when those for Comparative Example 4 are taken as standards.

TABLE 2

|  | Solid Electrolytic Capacitor A3 | Solid Electrolytic Capacitor A4 | Solid Electrolytic Capacitor A5 | Solid Electrolytic Capacitor C4 | Solid Electrolytic Capacitor C5 | Solid Electrolytic Capacitor C6 |
| --- | --- | --- | --- | --- | --- | --- |
| Capacitance | 1.03 | 1.10 | 1.16 | 1.00 | 1.01 | 1.02 |
| ESR | 0.86 | 0.87 | 0.85 | 1.00 | 0.98 | 1.00 |
| Leakage Current | 0.38 | 0.07 | 0.03 | 1.00 | 0.81 | 0.58 |

The solid electrolytic capacitors A3-A5 of Examples 3-5 according to the third aspect of the present invention exhibit higher capacitance values and lower ESR and leakage current values compared to the counterpart solid electrolytic capacitors C4-C6 of Comparative Examples 4-6.

These results demonstrate that the use of the coupling agent having a phosphonic acid group, in accordance with the present invention, successfully lowers the ESR and leakage current.

As can be clearly seen from comparison between the solid electrolytic capacitor A3 of Example 3 and the solid electrolytic capacitor A4 of Example 4, the leakage current can be further lowered by the sequence of forming the first conductive polymer layer 4a by a chemical polymerization process, forming the coupling agent layer and forming the second conductive polymer layer 4b on the coupling agent layer by a chemical polymerization process.

As can also be clearly seen from comparison between the solid electrolytic capacitor A4 of Example 4 and the solid electrolytic capacitor A5 of Example 5, the further lowered leakage current and increased capacitance result from the formation of the second coupling agent 3b between the second conductive polymer layer 4b and the third conductive polymer layer 4c.

What is claimed is:

1. A solid electrolytic capacitor comprising:
   an anode composed of a valve metal or its alloy;
   a dielectric layer formed on a surface of said anode;
   a first coupling agent layer formed on said dielectric layer and containing a coupling agent having a phosphonic acid group;
   a first conductive polymer layer formed on said first coupling agent layer;
   a second coupling agent layer formed on said first conductive polymer layer and containing a coupling agent having a phosphonic acid group;
   a second conductive polymer layer formed on said second coupling agent layer; and a cathode layer formed on said second conductive polymer layer.

2. The solid electrolytic capacitor according to claim 1, wherein said coupling agent is represented by the general formula wherein R represents a hydrocarbon group having a carbon number of 1-18, alkyl group having a carbon number of 1-18, alkoxy group, aryl group, phenyl group, ether group, thiophen group, pyrrole derivative, aniline derivative, vinyl-containing derivative, epoxy-containing derivative, styryl-containing derivative, methacryloxy-containing derivative, acryloxy-containing derivative, amino-containing derivative, ureido-containing derivative, chloropropyl-containing derivative, mercapto-containing derivative, sulfide-containing derivative or isocyanate-containing derivative.

3. A solid electrolytic capacitor comprising:
an anode composed of a valve metal or its alloy;
a dielectric layer formed on a surface of said anode;
a first conductive polymer layer formed on a surface portion of said dielectric layer;
a coupling agent layer formed over said first conductive polymer layer and the surface region of said dielectric layer that is left uncovered by the first conductive polymer layer and containing a coupling agent having a phosphonic acid group;
a second conductive polymer layer formed on said coupling agent layer; and
a cathode layer formed on said second conductive polymer layer,
wherein said coupling agent is represented by the general formula wherein R represents a hydrocarbon group having a carbon number of 1-18, alkyl group having a carbon number of 1-18, alkoxy group, aryl group, phenyl group, ether group, thiophen group, pyrrole derivative, aniline derivative, vinyl-containing derivative, epoxy-containing derivative, styryl-containing derivative, methacryloxy-containing derivative, acryloxy-containing derivative, amino-containing derivative, ureido-containing derivative, chloropropyl-containing derivative, mercapto-containing derivative, sulfide-containing derivative or isocyanate-containing derivative.

4. The solid electrolytic capacitor according to claim 3, further comprising a third conductive polymer layer interposed between said second conductive polymer layer and said cathode layer.

5. The solid electrolytic capacitor according to claim 4, wherein a second coupling agent layer is interposed between said second conductive polymer layer and said third conductive polymer layer.

6. A method for fabrication of a solid electrolytic capacitor including the steps of:

forming a dielectric layer on a surface of an anode composed of a valve metal or its alloy;
forming a first coupling agent layer containing a coupling agent having a phosphonic acid group on said dielectric layer;
forming a first conductive polymer layer on said first coupling agent layer,
wherein said coupling agent is represented by the general formula wherein R represents a hydrocarbon group having a carbon number of 1-18, alkyl group having a carbon number of 1-18, aryl group, phenyl group, ether group, thiophen group, pyrrole derivative, aniline derivative, vinyl-containing derivative, epoxy-containing derivative, styryl-containing derivative, methacryloxy-containing derivative, acryloxy-containing derivative, amino-containing derivative, ureido-containing derivative, chloropropyl-containing derivative, mercapto-containing derivative, sulfide-containing derivative or isocyanate-containing derivative;
forming a second coupling agent layer containing a coupling agent having a phosphonic acid group on said first conductive polymer layer; and
forming a second conductive polymer layer on said second coupling agent layer.

7. A method for fabrication of a solid electrolytic capacitor including the steps of:
forming a dielectric layer on a surface of an anode composed of a valve metal or its alloy;
forming a first conductive polymer layer on a surface portion of said dielectric layer;
forming a coupling agent layer containing a coupling agent having a phosphonic acid group over said first conductive polymer layer and the surface region of the dielectric layer that is left uncovered by the first conductive polymer layer; and
forming a second conductive polymer layer on said coupling agent layer,
wherein said coupling agent is represented by the general formula wherein R represents a hydrocarbon group having a carbon number of 1-18, alkyl group having a carbon number of 1-18, alkoxy group, aryl group, phenyl group, ether group, thiophen group, pyrrole derivative, aniline derivative, vinyl-containing derivative, epoxy-containing derivative, styryl-containing derivative, methacryloxy-containing derivative, acryloxy-containing derivative, amino-containing derivative, ureido-containing derivative, chloropropyl-containing derivative, mercapto-containing derivative, sulfide-containing derivative or isocyanate-containing derivative.

8. The method for fabrication of a solid electrolytic capacitor according to claim 7, further including the steps of:

forming a third conductive polymer layer on said second conductive polymer layer.

9. The method for fabrication of a solid electrolytic capacitor according to claim 7, further including the steps of:
- forming a second coupling agent layer containing a coupling agent having a phosphonic acid group on said second conductive polymer layer; and
- forming a third conductive polymer layer on said second coupling agent layer.

10. A method for fabrication of a solid electrolytic capacitor including the steps of:
- forming a dielectric layer on a surface of an anode composed of a valve metal or its alloy;
- forming a first coupling agent layer containing a coupling agent having a phosphonic acid group on said dielectric layer;
- forming a first conductive polymer layer on said first coupling agent layer;
- forming a second coupling agent layer containing a coupling agent having a phosphonic acid group on said first conductive polymer layer; and
- forming a second conductive polymer layer on said second coupling agent layer.

11. A method for fabrication of a solid electrolytic capacitor including the steps of:
- forming a dielectric layer on a surface of an anode composed of a valve metal or its alloy;
- forming a first conductive polymer layer on a surface portion of said dielectric layer;
- forming a coupling agent layer containing a coupling agent having a phosphonic acid group over said first conductive polymer layer and the surface region of the dielectric layer that is left uncovered by the first conductive polymer layer;
- forming a second conductive polymer layer on said coupling agent layer;
- forming a second coupling agent layer containing a coupling agent having a phosphonic acid group on said second conductive polymer layer; and
- forming a third conductive polymer layer on said second coupling agent layer.

* * * * *